United States Patent [19]

Feller

[11] Patent Number: 4,616,509

[45] Date of Patent: Oct. 14, 1986

[54] FLOW DETECTORS

[76] Inventor: Murray F. Feller, Box 1247, Dunnellon, Fla. 32630

[21] Appl. No.: 691,698

[22] Filed: Jan. 15, 1985

[51] Int. Cl.⁴ .............................................. G01F 1/32
[52] U.S. Cl. ................... 73/861.05; 73/861.32
[58] Field of Search ............... 73/861.05, 861.32, 255; 384/126, 461, DIG. 4

[56] References Cited

U.S. PATENT DOCUMENTS

| 501,727 | 7/1893 | Moore ........................... 308/DIG. 4 |
| 3,025,114 | 3/1962 | Beecher ................................. 384/461 |
| 3,167,958 | 2/1965 | Hollmann ........................... 73/861.91 |
| 3,381,531 | 7/1968 | Arutjunov et al. . |
| 3,443,432 | 5/1969 | Shonin et al. ........................... 73/255 |
| 3,861,210 | 1/1975 | Griverus ........................... 73/861.32 |
| 3,884,069 | 5/1975 | Lind ................... 73/861.32 |
| 4,157,660 | 6/1979 | Spacek . |
| 4,348,906 | 9/1982 | Feller ................. 73/861.77 |
| 4,462,264 | 7/1984 | Feller ................. 73/861.77 |

FOREIGN PATENT DOCUMENTS 125908 4/1959 U.S.S.R. .

Primary Examiner—Herbert Goldstein

[57] ABSTRACT

The disclosed apparatus includes novel fluid-flow detectors wherein a ball orbits along a circular track inside a wall that bears external piston-mode piezoelectric transducer means, the wall being of either plastic or metal. In one form of orbital-ball flow detector, the linear range of flow-versus-orbiting frequency is extended to lower flow rates by providing an inner track of the ball on a bearing member that is rotatable by the orbiting ball. The range of flow rates is also extended for an axial-flow detector having an orbital ball or a turbine-type rotor as the fluid-activated element by providing multiple subdivision passages having valves that close at successively lower main-passage flow rates, the subdivision passages having flow detectors whose outputs are combined to provide output that represents flow in the main passage.

11 Claims, 11 Drawing Figures

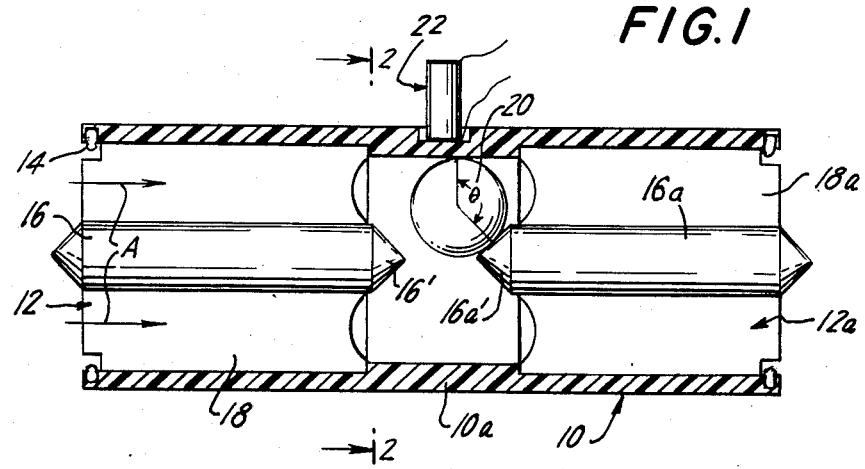
FIG.1
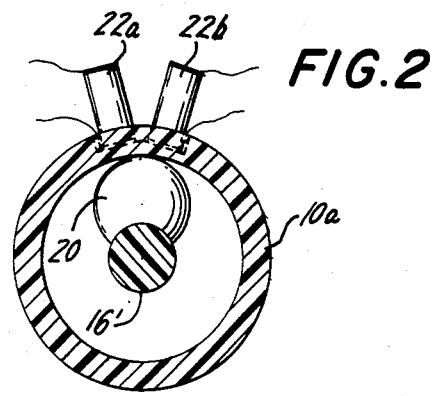
FIG.2
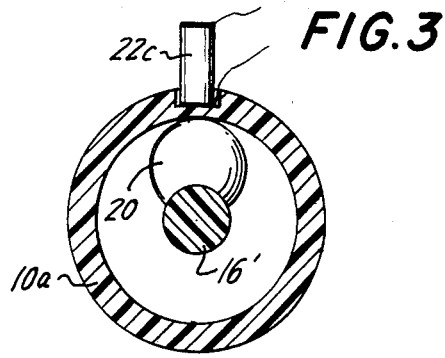
FIG.3
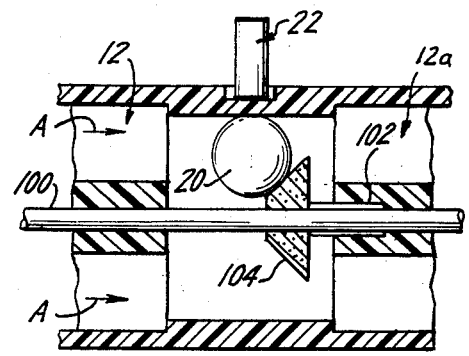
FIG.4
FIG.5

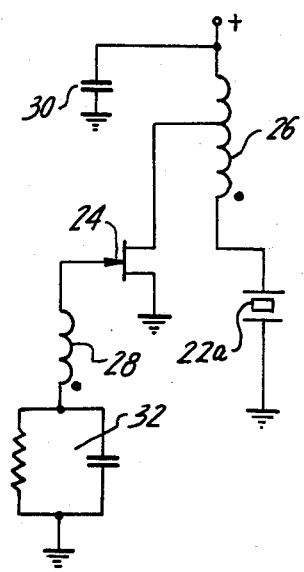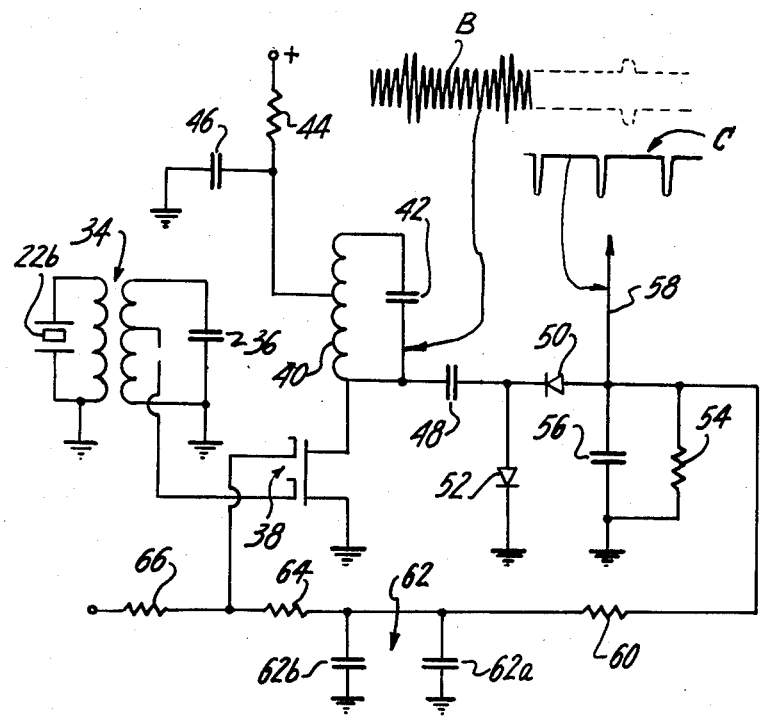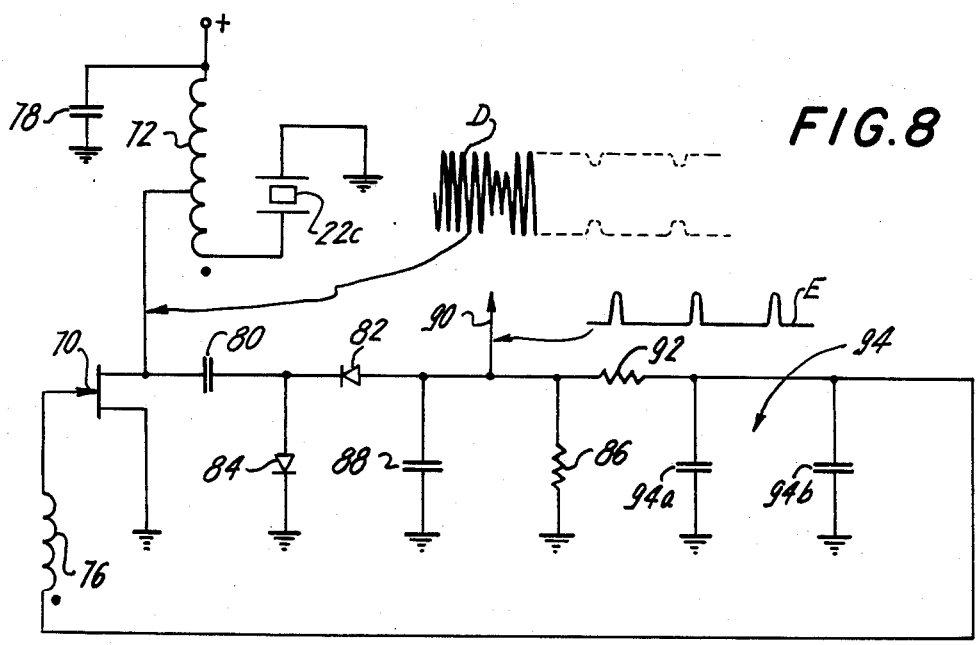

FLOW DETECTORS

The present invention relates to apparatus for producing a series of electrical pulses for measuring the volume and the rate of flow of liquid and gases such as steam in a passage.

BACKGROUND

A so-called "bearingless" flow sensor includes a fluid passage having means for causing the fluid to swirl in a detection zone, a ball in the detection zone that is caused to orbit by the swirling fluid, and a ball detector to produce electrical pulses representing orbits of the ball. Orbital-ball flow sensors are known which may be conveniently called the "axial-flow" type, in which fluid flows along a pipe having flow-swirling vanes at the entry and exit of the ball-orbiting zone. In another form that may be conveniently called the "toroidal" type, the fluid enters a toroidal passage containing the orbital ball, and it leaves either axially or tangentially.

Various forms of detector for the orbital ball have been devised for the toroidal type of flow sensor. In U.S. Pat. No. 4,157,660 to G. C. Spacek, toroidal flow sensors are shown having a photoelectric ball detector where the passage wall must be transparent at the detector, an inductive ball detector where a coil on a core magnet responds to a ball of magnetic material, and a capacitive type in which a ball orbits between a pair of capacitive electrodes.

Ball detectors in the axial type of orbital-ball flow sensors involve special difficulties and limitations. However, my application Ser. No. 667,766, filed Nov. 2, 1984, shows photoelectric ball detectors, and my application Ser. No. 677,873, filed Dec. 4, 1984, which is a continuation-in-part of application Ser. No. 501,810, filed June 7, 1983, now abandoned shows capacitive ball detectors in axial-flow orbital-ball flow sensors.

In each instance, there are constraints militating against the use of those flow sensors in some applications. Magnetic detectors involve drag on the ball severely distorting the otherwise linear flow-versus-pulse characteristic at low flow rates. Photoelectric ball detectors obviously require material for the flow passage that transmits light to the orbital path. Capacitive ball sensors require either exposure of the capacitive electrode to the fluid or non-metallic material for the flow passage.

In one aspect, the present invention relates to improvements in orbital-ball flow sensors, as more fully discussed below.

Various forms of flow sensors such as the orbital ball type and the vaned rotor type have a flow-vs-output characteristic that is essentially linear over a range that is limited. Accuracy of a flow sensor for a large-bore pipe, e.g. a 4-inch pipe, tends to suffer at the lower end of its range, and yet such flow might be at the middle or upper limit of the linear range of a small-bore pipe, e.g. ¾-inch pipe. Moreover, there are variations in the flow rate at different parts of a pipe's cross-section that may require particular attention for accurate measurement. A further aspect of the invention relates to providing novel wide-range flow sensors, i.e. flow sensors operable at relatively large flow rates, yet capable of accurate response at relatively low flow rates.

SUMMARY OF THE INVENTION

The present invention provides novel orbital-ball flow sensors, particularly but not exclusively of the axial-flow type, wherein the passage-defining wall may be either metal or a plastic material, where the ball may be of virtually any material (therefore not being limited to materials having particular electrical or magnetic properties) and where the flow sensor may be suitable or adapted for sensing the flow of either liquids or gases such as steam.

In this aspect of the invention, an orbital ball flow sensor has piezoelectric means acting on a portion of the flow-passage wall that defines the orbital path of the flow-activated ball. In one form, the piezoelectric excitation and receiving means is a single transducer serving as both transmitter and receiver, while separate transmitting and receiving transducers are used in another form.

Piezoelectric devices have been used in flow sensors in my U.S. Pat. Nos. 4,348,906, issued Sept. 30, 1982 and 4,462,264, issued July 31, 1984. However, those flow sensors relied on changes in the acoustic pattern introduced by a flow-activated vaned rotor. As set forth in my later patent, the mechanism is such that the radial-mode type of piezoelectric excitation and sensing of the passage wall yields distinctly higher sensitivity than the piston mode in detecting operation of the vaned rotor.

The theoretical mechanism underlying the operation of piezoelectric detection in orbital ball type of flow sensors here involved is evidently quite different. High sensitivity is realized here (in terms of the ball-representing output signal in relation to the level of piezoelectric excitation) where piston-type piezoelectric transducers are used. The orbital ball bears against an area of the wall that is involved in the piezoelectric action. Where a single piezoelectric transducer is used in a transmitter-receiver, the ball imposes loading that causes a dip in the piezoelectric signal. Where separate transducers are used as transmitter and receiver, the output rises as the ball passes the transducers. The ball which bears directly against the wall close to the receiver evidently provides increased coupling between the transducers as compared to the condition of the ball being away from the transmitter-receiver area. In both instances, however, whether one or two transducers are involved, the ball in the orbital-ball flow sensor bears directly against a piezoelectrically activated area of the wall of the passage. (That contrasts with the piezoelectric flow detectors of my patents where there is a vaned rotor out of contact with the passage-defining wall that bears the piezoelectric device(s).)

In the present piezoelectric orbital-ball flow detectors, the orbiting ball not only participates directly in the ball-detecting process by bearing against a directly involved area of the wall, but the orbiting ball keeps that area clear of deposits. In this way, the orbital ball maintains optimal ball-to-wall bearing for effective piezoelectric functioning over long periods of use. Moreover, there is no reliance, here, on developing an excitation pattern in the fluid. High output is obtainable here in response to flow of either liquid or gas.

Piston-mode piezoelectric transmitters exhibit end-to-end changes in dimension when a-c excitation is applied to electrodes at its ends, and a-c output is obtained at the electrodes of piston-mode piezoelectric receivers when mechanical stress reversals are applied from end to end. In radial-mode piezoelectric devices, the dimension changes of a device used as a transmitter due to applied a-c excitation, and the mechanical stresses to which a receiver responds, are in planes essentially parallel to the opposite electrodes. Piston-mode piezoelectric transducers tend to be relatively thick between their electrodes, being cylinders or other shapes while radial-mode transducers are ordinarily relatively thin round or rectangular plates with electrodes on opposite faces. Both modes of operation occur to some extent in each type of device. A transducer is known as one or the other type by the mode that predominates, as a result of its proportions and its manufacturing processes. As applied to flow detectors, piston-mode piezoelectric transducers can be distinguished from radial-mode piezoelectric transducers by their very different optimal operating frequencies. In my U.S. Pat. No. 4,462,264 where radial-mode piezoelectric transducers are used in vaned rotor flow detectors, optimal operating frequencies are typically in the high audio range. In contrast, vastly higher operating frequencies are optimal in typical examples (see below) of orbital ball flow detectors having piston-mode piezoelectric transducers.

In an aspect of the invention related to axial-flow orbital-ball flow sensors having piezoelectric ball detectors as well as axial-flow orbital-ball flow sensors with other forms of ball detectors, the characteristic linearity of axial-type orbital-ball flow sensors is improved at the low end of the range by reducing still further the inherently low friction of the orbiting ball. In such orbital ball sensors, the orbiting ball is captive between a circular track along a surface of the flow-passage wall and an inner bearing that is typically conical. The two bearing points of the ball against the circular track and the inner bearing subtend substantially less than 180 degrees. As a result, the ball has a twisting component of motion at each bearing point of contact that represents friction. Where liquid flow is to be sensed, the liquid itself serves as a lubricant. However, where gas flow (such as steam) is being monitored, that fluid does not provide lubrication. Orbital ball flow detectors of the axial flow type are improved according to a further feature of the invention by providing a rotary bearing for the ball's inner bearing. That inner bearing merely precesses slowly as the ball orbits, so that any wear of the bearing that there may be occurs very slowly and consequently such wear has no significant effect on the long life of the flow detector.

In a further aspect of the invention, the operating range of orbital ball flow detectors as well as vaned-rotor flow detectors and others is increased and linearity of the signal output versus flow is extended. In the novel wide-range flow detectors detailed below, the flow passage is subdivided into multiple passages each having its own flow sensor, and the outputs of the sensors are combined. Each of the divided passages (except one) has a valve, and the valves are adjusted to close in succession as the flow decreases from maximum toward a fraction of the maximum. For example, there may be five passages, and in this example their cross-sections may be equal. Valves for four of the passages are self-closing at successively lower flow rates, e.g. 80% of maximum, 60%, 40% and 20%. At the lowest flow rates of each passage, the valve ideally should close fully at a flow rate which is above that at which the related flow sensor is non-linear. However, even if the valve should close gradually so as to leak before becoming fully closed, any such leakage would represent only a small error due to the non-linearity of its flow sensor at the low end of its range. That error is only 1/5 (this example) of the error due to non-linearity at low flow rates that would occur if only a single flow sensor of the same type were used for the entire flow.

The nature of the invention and its further novel features and advantages will be best appreciated from the following detailed description of the various embodiments shown in the accompanying drawings.

BRIEF DESCRIPTION OF THE DRAWINGS

FIG. 1 is a somewhat diagrammatic longitudinal cross-section of illustrative mechanical portions of a novel flow sensor;

FIG. 2 is a transverse cross-section of the apparatus of FIG. 1 at the plane 2—2 of FIG. 1;

FIG. 3 is a transverse cross-section of a modification of the apparatus in FIGS. 1 and 2;

FIGS. 4 and 5 are somewhat diagrammatic longitudinal cross-sections of the mechanical portions of two further modifications of the apparatus in FIGS. 1 and 2, also representing modifications of the apparatus in FIG. 3;

FIG. 6 is an excitation circuit for the piezoelectric transmitter in FIG. 2;

FIG. 7 is a wiring diagram for the piezoelectric receiver in FIG. 2;

FIG. 8 is a wiring diagram for the piezoelectric transducer in FIG. 3;

THE ILLUSTRATIVE EMBODIMENTS

Figure 9:
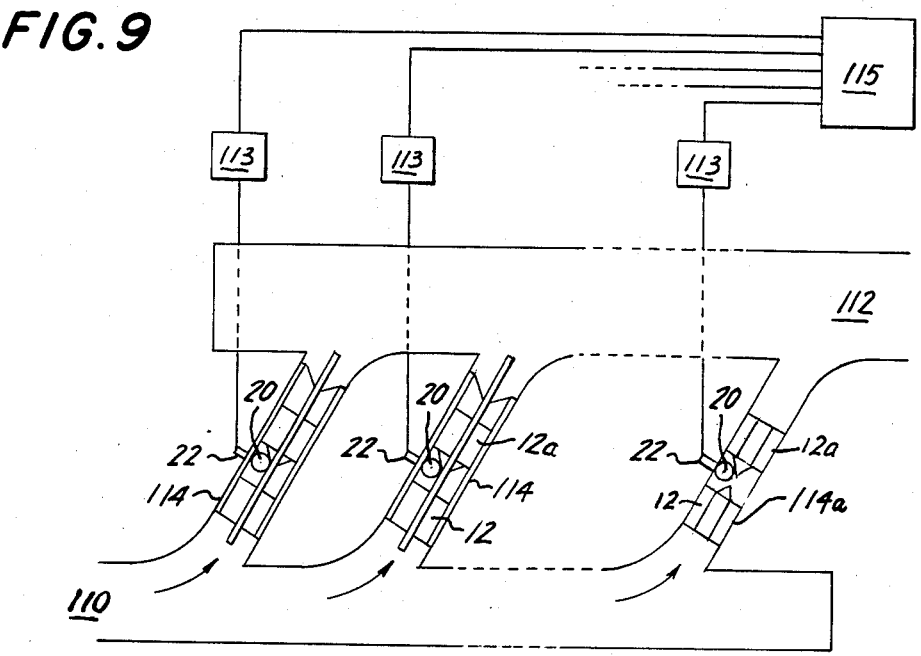
FIG. 9 is a longitudinal cross-section, drawn to reduced scale, of a novel flow sensor including a circuit diagram, embodying multiple separate-path flow sensors, each being a modification of any of the flow sensors as in FIGS. 1-5.

Referring now to FIGS. 1 and 2 of the drawings, pipe 10 of plastic contains two vane units 12 and 12a abutting a thickened wall portion 10a of the pipe and held in place by retaining snap-rings 14. Vane units 12 and 12a are identical parts of molded plastic that comprise hub 16, 16a and vanes 18, 18a, respectively. Hubs 16, 16a have conical ends 16' and 16a' that form inner bearings for ball 20. Wall portion 10a forms an outer bearing for ball 20, actually two circular tracks are formed. Their separation is determined by the small clearance between ball 20 and one inner bearing 16' or 16a' when the ball is pressed against the other inner bearing 16' or 16a'. When the fluid flows in pipe 10 in the direction of arrows A, ball 20 bears against inner bearing 16a' and wall portion 10a. The contact points at which the ball touches its bearings are separated by an angle $\theta$ of less than 180° yet more than 90°, measured from the center of the ball as shown in FIG. 1. Expressed otherwise, the radii of the outer and inner circular tracks against which the ball travels differ from each other by more than the radius of the ball, yet the track radii differ by less than the diameter of the ball. This relationship is also characteristic of the embodiments in FIGS. 4, 5 and 10 that are described in detail below.

Vanes 18 and 18a are spiralled about their hubs to produce a lengthwise and swirling flow pattern in the zone between units 12 and 12a, for inducing ball 20 to orbit when fluid flows along the pipe. The flow pattern in the orbital zone has a lengthwise or axial component and a circular component about the common axis of pipe 10 and hubs 16, 16'. In an example, an effective swirling flow pattern is produced by vaned units 12, 12a each having four vanes 18, 18a, the radial leading edge of each of those four vanes being displaced 135° about the axis from the downstream radial edge of such vane.

The wall of pipe 10 is shown as plastic but, as will be seen, it may also be of brass or other metal. In an example, the inside diameter of the pipe is 0.7 to 0.75 inch, and the diameter of ball 20 is ⅜ inch. Polypropylene is a suitable material for use in a flow sensor for water, because polypropylene has a density of about 90% that of water and acts very nearly as if it had zero buoyancy. That quality promotes excellent linearity of the orbital flow sensor to very low flow rates. The centrifugal force acting on the ball as it orbits tends to press it against its outer circular bearing track, and the fluid flow along the pipe urges the ball against its inner bearing 16a' for the illustrated direction of flow.

The polypropylene can be loaded with higher-density particles to increase its density to unity if that were critical. Hollow balls of polypropylene, pierced to become filled with liquid, can be used to advantage for providing a ball whose density is a near-approximation of water or other common liquids. Polysulfone and Teflon (tetrafluroethylene) are other tough, durable materials suitable for the orbital balls. Hollow thin-walled spheres of stainless steel are also suitable. Light-weight balls are of advantage for wide-range operation of the present orbital ball flow sensors where the fluid is a gas such as steam.

The structure thus far described represents a ball-orbiting unit in all respects suitable for both of the embodiments of FIGS. 2 and 3, so that FIG. 1 is equally a longitudinal cross-section of FIG. 3. Consequently, almost all of the reference numerals in all three Figures are the same. Completing the mechanical portion of the orbital-ball flow sensor, transducer means 22 (FIG. 1) is bonded to the exterior of pipe 10. It was shown that ball 20 bears against annular wall portion 10a as it orbits, forming a circular track, one such track when urged against inner bearing 16a' by fluid flowing in the direction of arrows A (as shown in FIG. 1) or a second circular track when the ball is urged against the other inner bearing 16' when the fluid flows in the opposite direction. The clearance between inner bearing 16' and ball 20 (or between inner bearing 16a' and ball 20) is small enough for transducer means to function opposite both tracks. If there were to be only one direction of flow, the transducer means in either form of FIG. 1 or 2 would best be centered opposite the one outer circular bearing track of ball 20.

In FIGS. 2 and 3, the outer surface of pipe portion 10a is shown recessed to provide two flat areas (FIG. 2) or one flat area (FIG. 3) where a piezoelectric transmitter 22a and a piezoelectric receiver 22b are mounted or where piezoelectric transducer 22c is mounted. Bonding cement adheres the transducers 22a, 22b and 22c to their respective mounting areas. If the cement layer were appreciably thick, the cement should be firm (not rubbery) for providing effective coupling between the piezoelectric means and the wall of the pipe at the normally high operating frequencies of the apparatus.

In both FIGS. 2 and 3, each transducer is distinctively effective when it is a piston-mode device, mounted so that its end-to-end vibrations are directed along a radius of the pipe. Vibrations of the transmitter drive an area of the pipe in-and-out radially. At the high operating frequency, that area is only moderately larger than the end of the transmitter. In FIG. 2, it may be considered that the vibrated area of the wall vibrates the ball and that the ball, in turn, is a vibrating source that is coupled to the receiving transducer. When the ball moves along its circular track and away from piezoelectric elements 22a and 22b, there is very little coupling between these piezoelectric elements.

FIGS. 6 and 7 show illustrative wiring diagrams forming part of the flow sensor of FIG. 2. FIG. 6 is an excitation circuit for piezoelectric transmitter 22a and FIG. 7 is an illustrative receiving and demodulating circuit for piezoelectric receiver 22b.

In FIG. 6, FET 24 is connected to tank coil 26 and feedback coil 28 that are coupled to each other to form an oscillator. The terminals of piezoelectric transmitter 22a are connected to coil 26 and ground, respectively. Bypass capacitor 30 at the (+) d-c supply terminal and R-C self-bias unit 32 complete the illustrative driving or excitation circuit for transducer 22a.

In FIG. 7, the electrodes of receiving transducer 22b are connected to an input high-frequency transformer 34 tuned by capacitor 36. Dual-gate FET 38 which serves as an amplifier has one gate connected to transformer 34. The drain of FET 38 is connected to a load coil 40 tuned by capacitor 42 to the same high frequency as that of transformer 34. Resistor 44 and capacitor 46 provide a filtered connection between coil 40 and the (+) d-c supply terminal. The selectively amplified output signal B appears at coupling capacitor 48. Diodes 50 and 52, connected as shown, and parallel resistor 54 and capacitor 56 form a demodulator for signal B, yielding a series of flow-representing pulses C at terminal 58.

The rectified output of the amplifier is also supplied to a long-time-constant filter including series resistor 60 and shunt capacitance 62, including a large electrolytic capacitor 62a and a small electrostatic capacitor 62b. Voltage divider resistors 64 and 66 provide bias to the gain-control gate of FET 38.

When ball 20 (FIG. 2) orbits past that portion of its circular track at pipe portion 10a where transducers 22a and 22b are mounted, there is a momentary sharp rise in the output of transducer 22b and of the amplifier. Ball 20 is firmly pressed against wall portion 10a as it orbits and the orbital contact area is maintained clean of deposits that might interfere with the effective coupling of the ball to the wall area. When the ball is outside the region of piezoelectric transmitter 22a and piezoelectric receiver 22b, there is evidently little coupling between them; but when ball 20 is in that region, there is greatly enhanced coupling, producing an amplitude-modulated output signal B comprising a series of spaced-apart bursts. In an example, with piston-mode lead titanate zirconate piezoelectric transducers 22a and 22b of ⅛-inch diameter and ⅛ to ½ inch long and placed 0.050 inch apart, on a wall that was 0.06-inch thick, typically at 400 kHz to 100 kHz, high output signals were obtained with an orbiting polypropylene ball in flowing water, the wall of the pipe being either plastic or brass. In this example, a driving signal of 10 volts peak-to-peak yielded an output signal of a few tenths of a volt for PVC pipe, somewhat less for brass.

FIG. 8 shows a circuit for effective operation of the transmitter-transducer 22c (FIG. 3) as an orbital ball detector. FET 70 with tank coil 72 connected to its drain and feedback coil 76 connected to its gate, and with its source grounded, serves as an oscillator connected to excite and respond to piezoelectric transducer 22c. Capacitor 78 is a by-pass for the (+) d-c supply terminal as shown.

Signal D at the FET drain is coupled by capacitor 80 to diode rectifiers 82 and 84 connected as shown to demodulating filter resistor 86 and capacitor 88. A series of flow-representing pulses E is obtained at output terminal 90. Evidently when ball 20 bears against the part of the wall where transducer 22c acts, the ball imposes a loading effect that damps the vibration. This is represented by the dips in amplitude of signal D. Bearing of the ball against the wall would be impaired for this purpose by any accumulation of a spongy deposit but the orbiting ball keeps the bearing area clean of any such deposit. A $\frac{1}{8}$-inch diameter, $\frac{1}{4}$-inch long lead tetanate zirconate piezoelectric transducer yielded pulses of the same magnitude as the example above of FIG. 2.

The piezoelectric orbiting ball detectors of FIGS. 1-3 have the distinctive value of operating well without depending on particular materials of the pipe wall, the ball or the fluid. Accordingly, the materials exposed to the fluid can be chosen largely for their suitability for exposure to the fluid. For example, the piezoelectric flow sensors of FIGS. 1-3 can be used with steam at high temperature and pressure, the choice of materials being governed mainly by their compatibility with steam.

In FIG. 2 where two piezoelectric elements constitute the piezoelectric transducer means fixed to the passage wall, those elements are shown as being mounted at different arcuate positions along a common circle around the pipe's axis. They may just as well be mounted close to each other at two points along a line parallel to the pipe's axis.

FIGS. 4 and 5 show two further embodiments of the orbital-ball structure forming part of flow detectors of FIGS. 1-3 and FIGS. 6-8. FIGS. 4 and 5 represent improvements for extending the linearity of those orbital-ball flow detectors, and of axial-flow orbital-ball flow sensors generally, to lower flow rates, and to improve their performance with gases that lack the benefit of flowing liquid in lubricating the ball.

Ball 20 in FIG. 1 is tangent to its inner and outer bearing surfaces at two points and, as it rolls, there is a twisting component at each of its bearing points. That twisting component signifies friction in the travel of the orbital ball, a factor that impedes its response to low flow rates. The modifications in FIGS. 4 and 5 reduce that friction. The improvement is greater with gas flow, since the lubricating effect of liquid is lacking. In FIGS. 4 and 5, the same numerals are used as in FIGS. 1-3 for identical parts. No repeated description of those identical parts is necessary. Both a single transducer 22c as in FIG. 3 and two transducers 22a and 22b as in FIG. 2 can serve as transducer means 22 of FIGS. 4 and 5 with the circuits of FIGS. 6-8, as appropriate.

In FIG. 4, a shaft 100 is fixed along the common axis of vane units 12 and 12a. Shaft 100 is of a material chosen for long life and immunity to the effects of various fluids. A tube 102 as of stainless steel extends loosely about shaft 100 and is fixed in the hub of vane unit 12a. A rotor 104 having a conical bearing surface for ball 20 is rotatably supported on shaft 100. Tube 102 provides thrust resistance for rotor 104. The rotor 104 is of graphite, to have low frictional contact to ball 20 and thrust bearing 102.

As ball 20 orbits, it has twisting contact with rotor 104, but a component of that twisting contact is converted into slow precessing rotation of rotor 104. The effect of such precession is to reduce the friction of ball 20 at low flow rates as compared with the friction of ball 20 against a fixed inner conical bearing such as 16a'. Consequently, a wider range of linear response of the ball's orbiting rate should be expected. The radius of rotor 104 where ball 20 acts is much larger than the radii of shaft 100 and thrust bearing 102, so that friction of ball 20 on rotor 104 promotes turning of the rotor.

In FIG. 4, only one conical inner bearing element 104 is provided for ball 20. Flow must be limited to the direction of arrows A. In FIG. 5, the orbital ball structure is further modified. The same shaft 100 as in FIG. 4 is fixed along the axes of vane units 12 and 12a. Ball 20 has an inner bearing 106 as of graphite that is rotatable on and slidable along shaft 100. Bearing 106 has two conical bearing portions 106a and 106b. Only one of those conical bearing surfaces at a time engages ball 20 when the ball is orbited by flowing fluid. There is always clearance between ball 20 and one of the conical bearing surfaces.

Stainless steel thrust-bearing tubes 108 and 108a are set into vane units 12 and 12, respectively. The ends of tubes 108 and 108a are spaced farther apart than the length of bearing 106. The axis of the apparatus is vertical and fluid—especially a gas such as steam—is arranged to flow upward. For low velocities, the light bearing of ball 20 against lower bearing portion 106a has little incidental friction as explained in connection with FIG. 4. Moreover, the flow direction tends to lift the ball away from that lower inner bearing, further reducing the residual friction. As the flow velocity increases, ball 20 is lifted away from lower bearing position 106a. Due to centrifugal force, ball 20 continues to bear against the outer track provided by pipe portion 10a as the ball orbits. At maximum flow rate, ball 20 bears against upper bearing portion 106b of the ball's inner bearing 106 and presses bearing 106 against thrust bearing 108a. Just as in FIG. 4, the frictional effects of the ball's contact with its conical inner bearing 106b are reduced, as compared with a fixed conical inner bearing. Turning of rotor 106 by ball 20 is assured, inasmuch as the bearing radii of rotor 106 on shaft 100 and thrust bearings 108 are much smaller than the bearing track of ball 20 on rotor 106.

FIG. 9 shows an adaptation of any of the flow sensors of FIGS. 1-5, for achieving linear response over a wider range than that of any particular flow sensor. As noted above, the orbital-ball form of flow sensor has a linear response over a considerable range of flow rates, meaning that the frequency of output pulses varies in proportion to different flow rates over a range. This is true not only for the orbital-ball flow sensors having piezoelectric orbiting-ball detectors but also those having capacitive, photoelectric and still other ball detectors. Characteristically, orbiting of the ball in FIGS. 1-5 is influenced by the entire cross-section of the fluid. This is true, too, of other forms of in-line flow sensors that yield a series of flow-representing output pulses, such as those having a turbine-type vaned rotor disposed axially along a pipe. Such a flow sensor may include various forms of detectors for the flow-activated element that operates in cycles (like the orbital ball and the vaned rotor) and they may have various known detectors. A series of flow-representing output signals is produced in response to cyclic operation of the flow-activated element. For example, a piezoelectric detector is shown in a flow sensor having a turbine-type flow-activated vaned rotor in my U.S. Pat. Nos. 4,368,906 and 4,462,264.

In each instance, a single flow-activated orbital ball or vaned rotor, etc., is ordinarily used to respond to the flow. Furthermore, my U.S. Pat. No. 4,399,696, issued Aug. 23, 1983, shows multiple small flow sensors whose outputs are combined for providing a measure of the flow in a large flow passage, and my application Ser. No. 677,873 filed Dec. 4, 1984 shows multiple orbital ball flow sensors in respective flow passages that are subdivisions of the main flow passage for handling large-scale flow rates. All of those flow sensors have a common limitation: just as a single sensor becomes inaccurate or non-responsive at low flow rates representing a small percentage of its range, apparatus having multiple flow sensors is correspondingly inaccurate at low flow rates. Purely as an illustration, a given flow sensor may have a linear flow-representing output characteristic over a 20-to-1 range of flow rates. Below the 5% low end of the range (this example) the output is erroneous and may even cease. In apparatus having multiple sensors, the low-flow-rate error of the whole apparatus is essentially the same as that of each sensor alone.

Figure 10:
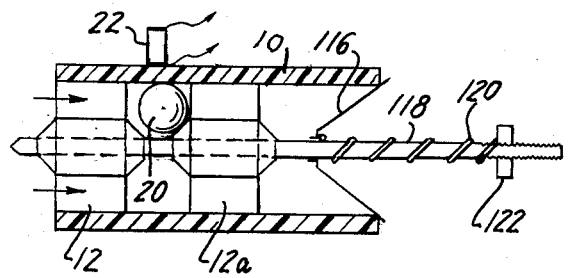
FIG. 10 is a longitudinal cross-section of a modified separate-path flow sensor of FIG. 9, drawn to larger scale than FIG. 9.

The apparatus represented in FIGS. 9 and 10 extends the linear characteristic of any given flow sensor to a wider range of flow rates. If a single orbital-ball flow sensor has a linear characteristic over a 20-to-1 range, in an example that range may be extended to 100-to-1.

In FIG. 9, the apparatus includes a main entry passage 110 and a main exit passage 112 and multiple subdivision passages 114 (including passage 114a). In this example, the cross-sections of all of the subdivision passages 114 and 114a are equal. Each passage 114 and 114a is equipped with a separate cyclic flow-activated element which here is any of the structures of FIGS. 1-5 or it may be any of the forms in my U.S. Pat. Nos. 4,333,354 or 4,462,264, or in my pending applications Ser. Nos. 667,766 or 677,873. Where all of the flow detectors are alike, their calibration is simplified and it is simple to combine their output signals.

Each of the flow sensors in FIG. 9 includes two vane units 12 and 12a as in FIGS. 1-5 for developing a swirling flow pattern in a sensing zone between them, and orbital ball 20 is confined in that zone. The ball orbits past ball-detection means 22 and is guided by bearings as described more fully above. Output of detection means 22 is derived by a suitable circuit 113, for example the circuits in FIGS. 6 and 7 or FIG. 8.

In an example, there are five parallel subdivision passages 114 of equal cross-section, such that each carries 1/5 of the total flow. The subdivision passages have essentially identical flow sensors—complete with their respective flow-activated elements 20, their detectors 22 and their respective circuits 113 for separately providing successions of pulses representing the flow in each subdivision passage. The total flow in each of the main passages 110 and 112 is measured by the combined outputs of the separate flow sensors. They may be combined by a network 115 such as that in my U.S. Pat. No. 4,399,696. As an alternative, pulses of the several flow sensors may be frequency-divided as by scale-of-10 or scale-of-100 counters, and the several frequency-divided outputs may be combined.

The flow sensor of FIG. 9 exhibits improved performance at the low flow-rate end of its range or, viewed otherwise, the upper end of the range is considerably increased without changing its lower limit of accuracy. Except for passage 114a, each of the several subdivision passages 114 has a valve comprising a movable closure 116 (FIG. 10) that is slidable on shaft 118 mounted in the hubs of units 12 and 12a. A coil spring 120 on each shaft 118 biases closure 116 toward its seat, opposite to the direction of flow. An adjusting nut 122 on a threaded length of shaft 118 provides for adjustment of the bias applied to each valve closure 116. As indicated above, there is no valve in the one subdivision passage 114a. The several valves are adjusted to close in succession at different total flow rates. Thus, the valve in the first subdivision passage 114 of the drawing is shown closed while, at the same time, the valve at the second subdivision passage 114 in the drawing is open. The fluid can flow freely at all times in the subdivision passage 114a where there is no valve.

All of the valves are open for the flow rate at the highest portion of the range of the apparatus. For a lower flow rate, one of the valves closes because there is insufficient pressure drop to keep it open. At that point, the flow is represented by the combined outputs of one less than the total number of subdivision flow sensors. The valves are arranged to close at a pressure difference above that at which low-flow inaccuracy arises in the performance of its associated flow sensor. It is thus apparent that, by the time the flow drops to a rate somewhat below the maximum of the unvalved subdivision flow sensor, the last of the valves in the other subdivision passages has closed.

The total flow may decrease to the rate at which the unvalved passage becomes inaccurate. However, that rate is 1/5 of the flow rate of the combined apparatus having the five subdivision passages assumed here, with their five individual flow sensors that include the pulse-deriving circuits. Accordingly, for flow sensors separately having linear response down to 5% of their range, the accuracy of the combined apparatus is extended to 100-to-1, the lower limit being reduced to 1% of the maximum.

It is not required that the flow rate versus output pulse frequency is to be linear over its operating range. Non-linearity can be taken into account by providing the circuit of each flow sensor with a nonlinearity-compensating circuit.

The valves described are self-closing when the pressure differential from one side of the valve to the other decreases below a set value. It is not necessary for such valves to close abruptly. A transition condition may develop when one valve starts to close and causes a reduction in the proportion of the fluid carried by its subdivision passage. Its flow sensor simply produces pulses at a correspondingly reduced frequency, without impairing the accuracy of the whole apparatus. Each valve should be adjusted to shut when the flow rate in its passage is above the low-flow error level of its related flow sensor. The transition condition for each valve is not a fundamental concern. If it were, then an on-off actuator could be provided for each valve, responsive to a pressure differential. The valve-control circuit should be designed to have hysteresis so as to prevent fluttering open-close-opening operation of the valve at a critical pressure difference.

Figure 11:
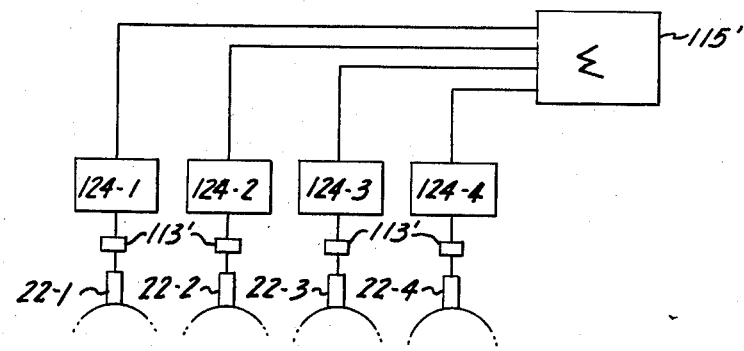
FIG. 11 is a circuit diagram of a modification of the flow sensor of FIG. 9.

The foregoing example may be altered so that the subdivision passages are unequal. For example, one of four subdivision passages and its flow sensor may be proportioned for half of the total range; a second subdivision passage and its flow sensor may be proportioned for one-quarter of the total range; and each of the third and fourth subdivision passages are then proportioned for one-eighth of the range; and valves present in the first, second and third subdivision passages are then adjusted to close with decreasing flow rates in the order named. For such apparatus, the circuit diagram of FIG. 9 requires modification, so that the pulses from each subdivision flow sensor are properly weighted in relation to the others before being combined. In FIG. 11, flow sensors 22-1, 22-2, 22-3 and 22-4 with their pulse-forming circuits 113' are provided for the four subdivision passages having cross-sections that are (in this example) 50%, 25%, 12.5% and 12.5%, respectively, of the total passage cross-section between main passages 110 and 112. The flow sensors and their circuits of the subdivision passages are of the same construction as described above and shown in FIGS. 1-8.

The swirl-inducing vanes of the large-bore subdivision passage that is to carry 50% of the total flow may differ from the vanes of the "25%" subdivision passage which, in turn, may differ from the vanes of the two "12.5%" subdivision passages. This factor and others result in orbital frequencies of the flow sensors in the four subdivision passages that do not have a simple relation to each other. For example, the flow sensors of the "50%" and "25%" passages may be found (by test) to emit 31 and 45 pulses per gallon, respectively, and each of the sensors for the "12.5%" subdivision passages may emit 93 pulses per gallon. A simple and economical way to weight those flow-sensor signals before combining them is to interpose digital dividers 124-1, 124-2, 124-3 and 124-4 between the pulse-output circuits of the separate flow sensors and combining counter 115'. In the example given, the pulse outputs of pulse generating circuits for the "50%", "25%" and (two) "12.5%" subdivision passages may simply be put through digital dividers 124-1, 124-2, 124-3 and 124-4 that are set up to divide by 31, 45, 93 and 93, respectively. After each set of 31 pulses, divider 124-1 of the "50%" subdivision passage emits a pulse to counter 115'. Divider 124-2 of the "25%" subdivision passage similarly emits a pulse after each series of 45 pulses; and dividers 124-3 and 124-4 each emits a pulse after each series of 93 input pulses. In this way, the total flow carried by the separate subdivision passages is registered properly in flow-representing output circuit 115'. With the described configuration the reponse of the apparatus to low flow rates is improved so that individual flow sensors in the subdivision passages may have a linear range of 10-to-1 (as an example) and the linear range of the apparatus is increased to 160-to-1.

Other forms of analog and digital weighting circuits may be substituted for the digital-based circuit of FIG. 11 between the flow sensing devices of the subdivision passages and the combining circuit 115'.

The foregoing exemplary embodiments of the invention in its various aspects, as described above and shown in the accompanying drawings, which form part of the disclosure of the invention, are subject to various modifications; and consequently the invention should be construed broadly in accordance with its true spirit and scope.

I claim:

1. Apparatus for sensing the flow of fluid, including an orbital ball, a tubular wall defining an axial fluid flow passage and providing an outer circular ball-guiding track on the inside of the wall, means providing an inner circular ball-guiding track, both of said tracks being centered at the axis of the tubular wall and defining an orbital path for the ball, vane means in said passage for forming a swirling ball-orbiting fluid-flow pattern crossing said orbital path, and means for detecting the orbiting of the ball, said detecting means including piston-mode piezoelectric transducer means fixed to said tubular wall and disposed on the exterior thereof substantially opposite said outer circular track, and excitation and receiver circuit means connected to said transducer means.

2. Apparatus as in claim 1, wherein said tubular wall is a material of the group consisting of metal and plastic.

3. Apparatus as in claim 1, wherein said piston-mode piezoelectric transducer means includes a piston-mode piezoelectric transmitter and a piston-mode piezoelectric receiver bonded to the exterior of said wall close to each other.

4. Apparatus as in claim 3, wherein said circuit means in cooperation with the rest of the above-mentioned apparatus is adapted to develop an amplitude-modulated signal including amplitude increases as the ball orbits past the transducer means.

5. Apparatus as in claim 1, wherein said piezoelectric transducer means includes a single transducer serving both as transmitter and receiver.

6. Apparatus as in claim 5, wherein said circuit means is adapted for both exciting said transducer and deriving an amplitude-modulated signal therefrom including dips in amplitude as the ball orbits past the transducer.

7. Apparatus as in claim 1, wherein said means providing said inner circular ball-guiding track includes a fixed hub and a bearing member having a pivotal support on said hub enabling the bearing member to rotate about the axis of the tubular wall, said bearing member providing said inner circular track and being adapted to be rotated by said ball as it orbits.

8. Apparatus for sensing the flow of fluid, including an orbital ball, a tubular wall defining an axial fluid flow passage and providing an outer circular ball-guiding track on the inside of the wall, means in said passage for providing an inner circular ball-guiding track, both of said tracks being centered at the axis of the tubular wall and defining an orbital path for the ball, the radii of said tracks differing by more than the radius of the ball but less than the diameter of the ball, vane means in said passage for forming a swirling ball-orbiting fluid-flow pattern crossing said orbital path and biasing said ball against said inner and outer tracks, and means including a ball-sensing element fixed to said wall for detecting the ball as it orbits, said means for providing an inner circular ball-guiding track including a fixed hub and a bearing member having a pivotal support on said hub enabling the bearing member to rotate about the axis of the tubular wall, said bearing member providing said inner circular track and being adapted to be rotated by said ball as it orbits.

9. Apparatus as in claim 8, wherein the diameter of said pivotal support is much smaller than that of the inner circular track for promoting rotation of said bearing member by said ball despite only slight torque applied to the bearing member by the ball as it orbits.

10. Apparatus as in claim 8, wherein the outer track and the inner track are respective parts of cylindrical and conical surfaces coaxial with each other.

11. Apparatus as in claim 8, wherein the diameter of the ball is only a bit less than the radius of said outer circular track.

\* \* \* \* \*